(No Model.)
B. HENLEY.
SWIVEL COUPLING FOR VEHICLES.
No. 540,162. Patented May 28, 1895.
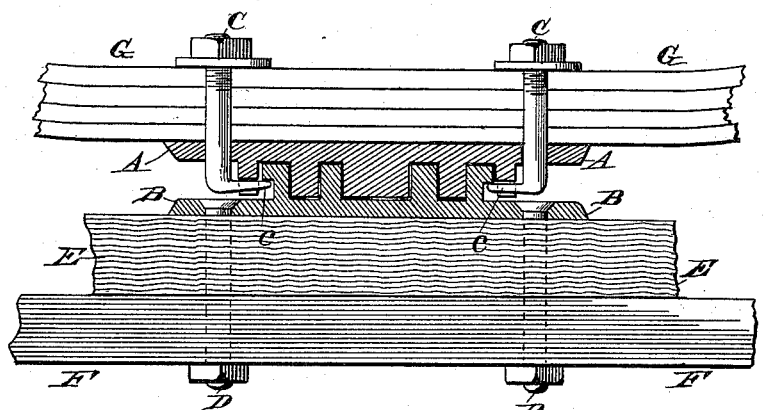
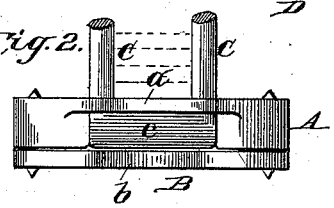
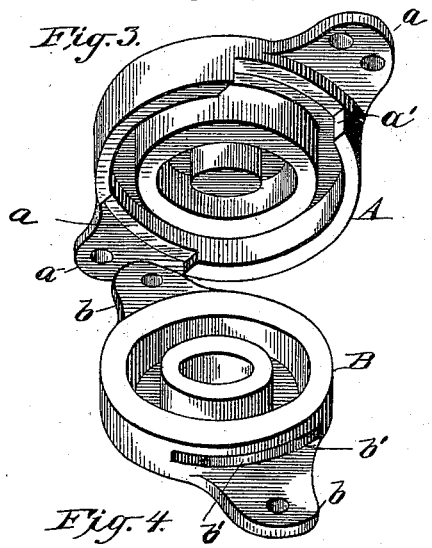
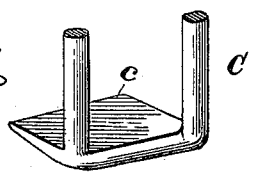
WITNESSES:
Fred G. Dieterich
H. J. Robinson
INVENTOR
Brown Henley.
BY Munn & Co
ATTORNEYS.

UNITED STATES PATENT OFFICE.

BROWN HENLEY, OF HILLSVILLE, PENNSYLVANIA.

SWIVEL-COUPLING FOR VEHICLES.

SPECIFICATION forming part of Letters Patent No. 540,162, dated May 28, 1895.

Application filed July 31, 1894. Serial No. 519,065. (No model.)

*To all whom it may concern:*

Be it known that I, BROWN HENLEY, a citizen of the United States, residing at Hillsville, in the county of Lawrence and State of Pennsylvania, have invented certain new and useful Improvements in Swivel-Couplings, of which the following is a specification.

The object of my invention is to provide an improvement in the class of swivel or pivot couplings for connecting two adjacent parts which require to turn more or less on each other, and which is particularly adapted for the front axles of carriages and wagons.

The construction and operation of the coupling are as hereinafter described.

In the accompanying drawings, Figure 1 is a central longitudinal vertical section of the coupling applied to the front axle of a carriage. Fig. 2 is an end view of the coupling. Fig. 3 is a perspective view of the parts of the coupling separated from each other. Fig. 4 is a perspective view of the clamp or clip which holds the two rotatable parts of the coupling in engagement. The said rotatable parts A and B (see Fig. 3) compose the body of the coupling and are constructed with circular concentric projecting portions, which are adapted to fit together, as shown in Fig. 1. The part B is secured upon the wooden bolster E of the axle F by means of screws D, that pass through its lateral ears $b$, and the other part A is secured to the under side of the spring G by means of the clip C, whose arms pass through its ears $a$ and also through a plate lying on the upper surface of the spring.

My invention pertains particularly to the construction and arrangement of the clips, C, and their connection with the rotatable parts A, B, of the coupling. As shown best in Fig. 4, the clips are each composed of a claw, $c$, and two parallel arms which are arranged perpendicular to said claw. The upper ends of the clip arms are screw threaded, to adapt them for attachment of nuts, and the space between them is just sufficient to accommodate the spring, G, so that the arms closely embrace its sides.

The claws $c$, of the clips fit closely in notches or open slots, $a'$ formed in the outer circular flange of the coupling part, A, and enter the elongated recesses, $b'$, formed in the sides of the circular flange of the lower coupling member, B. The length of the recess $b'$, being say twice the width of the claw $c$, it is apparent a rotary movement of one coupling member on the other is permitted to this extent. In other words, the lateral movement of the claws $c$, in the recess, $b'$, determines the horizontal angle the axle, F, may assume to the spring, G, as the carriage is turned to the right or left. Thus the clips, C, serve as stops, limiting the degree to which the axle, F, may turn, and also securing the axle to the spring, G, and preventing any lateral movement of the latter without weakening it, as in the case of bolts that pass through it in the form of fastening usually employed. It is obvious that a wooden bolster may be substituted for the spring, G.

What I claim is—

The improved swivel coupling, composed of the lower member, having opposite recesses in the outer side of its exterior, circular flange, the upper member, adapted to engage such lower member, and having opposite notches in the edge of its outer flange, and the clips, arranged as shown, with their claws fitting said notches, and entering said recessses, which are elongated to allow lateral movement of the claws within certain limits as shown and described.

BROWN HENLEY.

Witnesses:
AMOS W. HART,
SOLON C. KEMON.